United States Patent [19]
Lee

[11] 3,804,275
[45] Apr. 16, 1974

[54] STAIR CLIMBER MOVING METHOD

[76] Inventor: William S. Lee, c/o Lee Moving and Storage, 13100 Cavere Ct., New Orleans, La. 70129

[22] Filed: Jan. 10, 1972

[21] Appl. No.: 216,597

Related U.S. Application Data

[63] Continuation-in-part of Ser. No. 9,223, Feb. 6, 1970, Pat. No. 3,633,774.

[52] U.S. Cl............... 214/152, 180/9.22, 214/38 R, 214/85, 214/505, 214/517
[51] Int. Cl............................................ B65g 67/02
[58] Field of Search............ 214/38 R, 38 B, 38 BA, 214/38 D, 152, 517; 180/9.22

[56] References Cited
UNITED STATES PATENTS
2,928,501 3/1960 Ramirej.......................... 180/9.22 X
3,512,658 5/1970 Harlan............................ 214/152 X

*Primary Examiner*—Robert G. Sheridan
*Attorney, Agent, or Firm*—Pugh & Laiche

[57] ABSTRACT

A stair climber moving system (FIGS. 1–2) for moving a load up flights of stairs (FIGS. 9A–9H) which includes a basic tractor unit, a load mounting platform attached to the tractor which allows the load to be shifted longitudinally with respect to the tractor during use (FIGS. 5A, 5B, 9F), an integrated winch system for changing the position of the load with respect to the tractor unit (FIGS. 7–7A), and a collapsible dolly (FIGS. 6A–6D) permitting changes from horizontal (6B) and inclined (6D) positions.

Having the dolly change from an inclined to a horizontal disposition minimizes the total horizontal, longitudinal dimension of the system which is particularly useful in very tight quarters such as occur on stair landings (cf. FIGS. 9G & 9H). Having a load-shifting capability during use permits precise balancing of the system as needed throughout the movement of the load up the stairs.

5 Claims, 26 Drawing Figures

PATENTED APR 16 1974 3,804,275

STAIR CLIMBER MOVING METHOD

REFERENCE TO RELATED APPLICATION

This application is a continuation-in-part of my copending application Ser. No. 9,223, filed on Feb. 6, 1970, entitled "Moving System," now U. S. Pat. No. 3,633,774, issued on Jan. 11, 1972.

BACKGROUND OF THE INVENTION

The present invention relates to a stair climber moving system for moving a load up flights of stairs utilizing power operated, load carrying tractor equipment capable of moving up and down stairs. More particularly, the present invention is directed to improvements in a moving system for moving a heavy load up a series of stairs and particularly relates to an improved system for mounting the load on a stair climber tractor unit, a winch system for changing the center of gravity of the load with respect to the stair climber tractor unit, and a collapsible dolly system for assistance in moving the loaded stair climber around a horizontal stair landing, particularly one which is in tight quarters.

Powered stair climbing, load carrying tractors per se are, of course, old in the art as seen, for example, in U.S. Pat. No. 3,512,658, issued May 19, 1970 to a Mr. Verle M. Harlan. Indeed, for illustrative purposes only, the present invention will be described as applied to and for use with a basic "Harlan" tractor similar to the embodiment of FIG. 4 of the Harlan patent; although, of course, the present invention is equally applicable to all types of power operated, load carrying, stair climbing devices.

Although these stair climbing devices are well known in the prior art, their use has left a lot to be desired, particularly when the load to be carried was very heavy, bulky and difficult to handle. In particular, the mounting of the load on the stair climbing device for transportation up the stairs was very unsatisfactory and in great need of improvement.

Another very difficult problem that has been encountered with prior art stair climbing devices was the transferring of the loaded stair climber from one flight of stairs, across a landing and onto a second flight of stairs. Herein problems arose because of the tight quarters found on many stair landings wherein mere inches of clearance are very critical.

Thus, the prior art enabled movers to move the heavy machinery up a flight of stairs with ease, but, upon reaching the landing, were still faced with the tugging and pushing and jolting of the loaded stair climber in order to manipulate it around the landing and up the next flight of stairs. This prior art method of transgressing the landing has made the advantage of the stair climber usually ineffective with regards to labor savings, in that three or more laborers would still be needed to manipulate the loaded stair climber on the landing. Even then, there would also be the sustained shock to the load during the manual handling thereof which may have been the very problem the stair climber was used to avoid.

Another major disadvantage of the prior art systems has been in the forced, manual balancing of the load while transgressing stairs and landings without any effective means available to otherwise relocate the center of gravity of the system. Movers found that at certain angles prior art systems became unbalanced to such an extent that immediate manual assistance was necessary to prevent the loaded system from toppling over, either backwards down the stairs or from side to side. While various aids have been devised and proposed as "solutions" to this problem, in the main they have proven unsatisfactory and none have disclosed a system as simple and as efficacious as the present invention.

Thus the basic object of the present invention was to overcome all of these prior art problems found in the moving of heavy, bulky loads up flights of stairs in a relatively simple, straightforward and reliable manner; and to solve these prior art problems without the need for any additional complex or particularly sophisticated devices, allowing the use of the present invention by the relatively unskilled working personnel used in the moving industry.

The present invention achieves these goals by providing a simple mounting technique for mounting the load onto the tractor unit by means of longitudinally sliding the load, having skirt flanges on both sides, onto the tractor unit, which in turn has side slots which mate with and hold the skirt flanges. The total horizontal, longitudinal dimension of the overall loaded moving system is minimized in tight quarters by the use of a collapsible dolly having both an inclined and a horizontal position. While finally, balancing of the load with respect to the tractor unit, and hence balancing the system generally, is achieved by a simple winch system that utilizes the motive power of the tractor itself as it moves to move the load with respect to the tractor unit.

BRIEF DESCRIPTION OF THE DRAWINGS

FIGS. 3A–4C are perspective side views, some fragmentary, showing the steps in mounting the machine or load on the tractor unit utilizing the system of the present invention;

FIG. 5A is a top plan view of the loaded system, while

FIG. 7 is a front, perspective, fragmentary view of the loaded tractor unit being driven up on the collapsible, inclined dolly and showing the front elements of the winch system of the present invention, for altering the position of the load, while FIG. 7A is a schematic side view of the working elements of the winch system;

FIG. 8 is a bottom view of the load platform sled showing the end connection of the winch rope to the load platform;

DESCRIPTION OF THE PREFERRED EMBODIMENT

Figure 1:
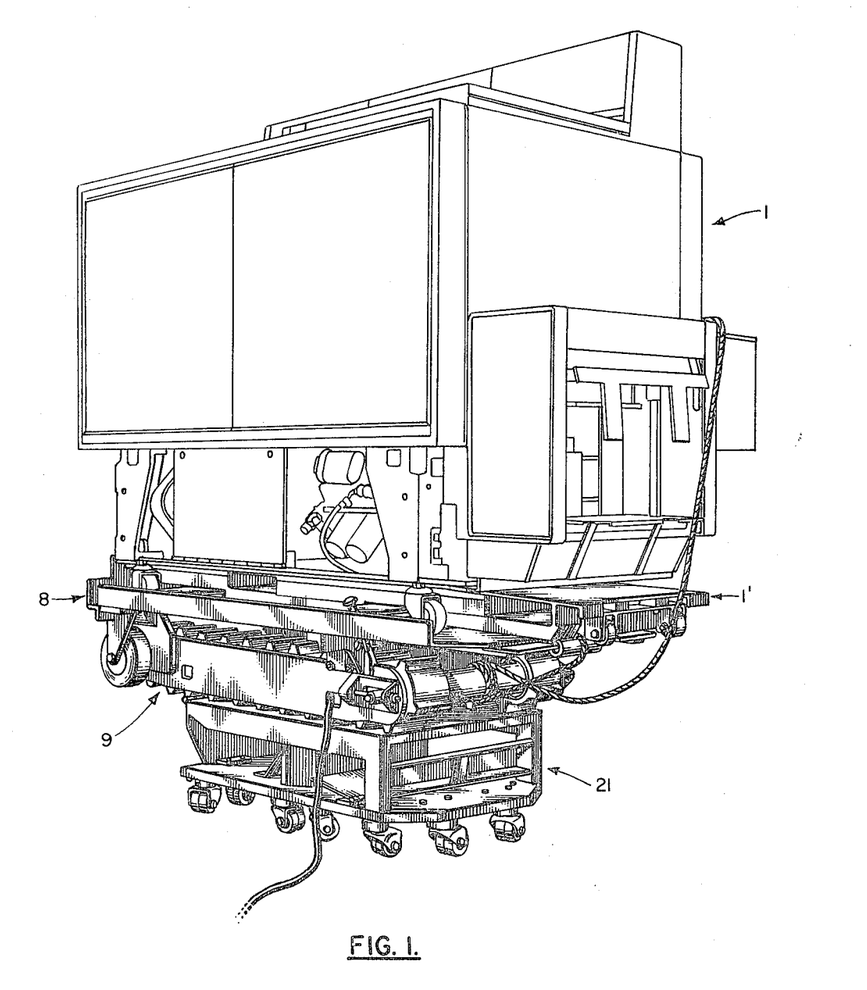
FIG. 1 is a perspective view of the total loaded moving system of the present invention, having a "XEROX" 2400 series unit as a load and with the collapsible dolly in its horizontal position.
Figure 2:
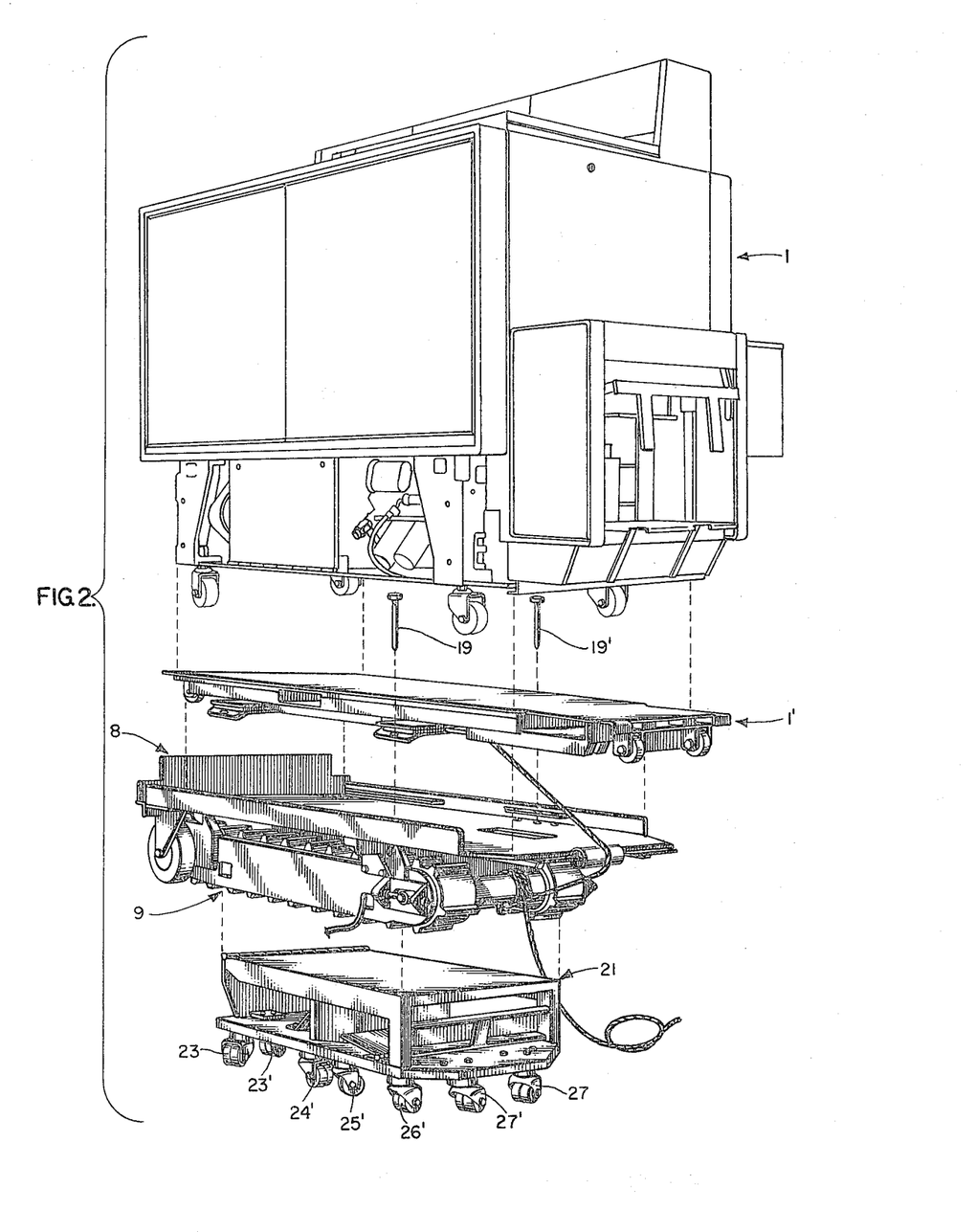
FIG. 2 is an exploded perspective view of the loaded moving system of FIG. 1 with the elements "exploded" apart.

The preferred embodiment of the present invention involves a moving system for moving a heavy, bulky load up a series of stairs and, as shown in FIGS. 1 and 2, includes primarily a stair climber basic tractor unit 9 with a special slotted loading platform 8 attached thereto, a load sled base unit 1', similar to that disclosed in the copending application Ser. No. 9,223 (U.S. Pat. No. 3,633,774) but with special flange adapters 67, and a collapsible dolly 32. Built into the tractor unit and utilizing the slidable mating relationship between the load 1 and the tractor unit 9 is a winch system (FIGS. 7–8) for altering the position of load 1 with respect to the tractor unit 9 for changing the center of gravity of the loaded moving system.

For a full and complete understanding of the stair climbing moving system of the present invention, the preferred embodiment will be described in terms of a typical situation encountered in the field and how the moving system is used in such a situation.

For exemplary purposes, it will be assumed that a mover is faced with moving a heavy, bulky load up at least two flights of stairs with a landing therebetween; that is, with a horizontal platform upon which one flight of stairs ends and the other flight of stairs begins. Additionally, for purposes of illustration only, the moving system of the present invention is described as applied to the moving of a "XEROX" duplication machine of the 2400 family, but it is, of course, applicable to the moving of heavy equipment or loads up stairs generally, particularly loads which are large, bulky and difficult to handle.

Finally, for purposes of illustration only, it will be assumed that the load 1 is a combined load having a base sled 1' attached thereto. The method and means of attaching the base sled 1' is disclosed in and is the subject of the copending parent application Ser. No. 9,223 (U.S. Pat. No. 3,633,774). For the sake of brevity, the disclosure of that application will not be repeated here and, instead, the entire disclosure is hereby bodily incorporated herein for the fullest understanding and appreciation of the present invention. However, the present invention is not restricted to use with the moving system of that copending application but is generally applicable and adaptable to all types of loads.

MOUNTING OF THE LOAD

Figure 3A:
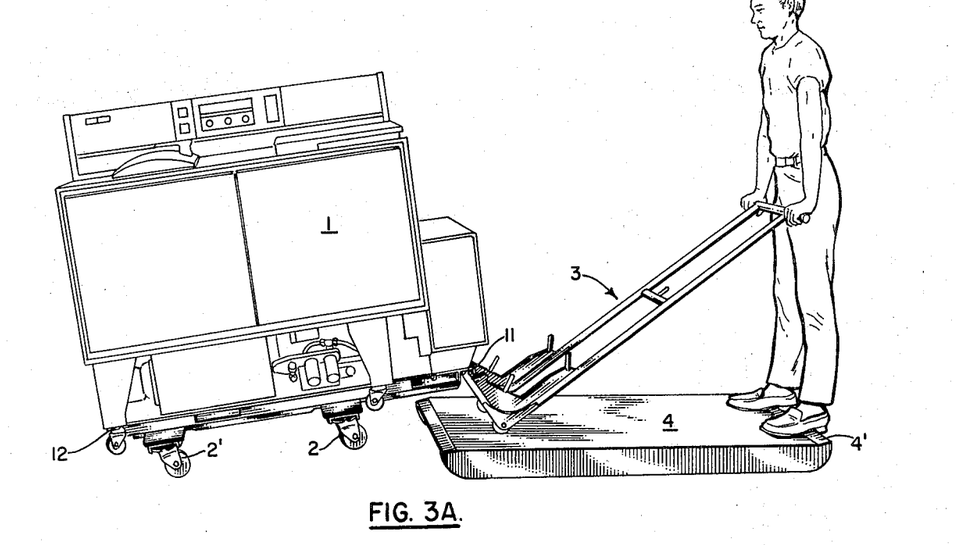
Figure 3B:
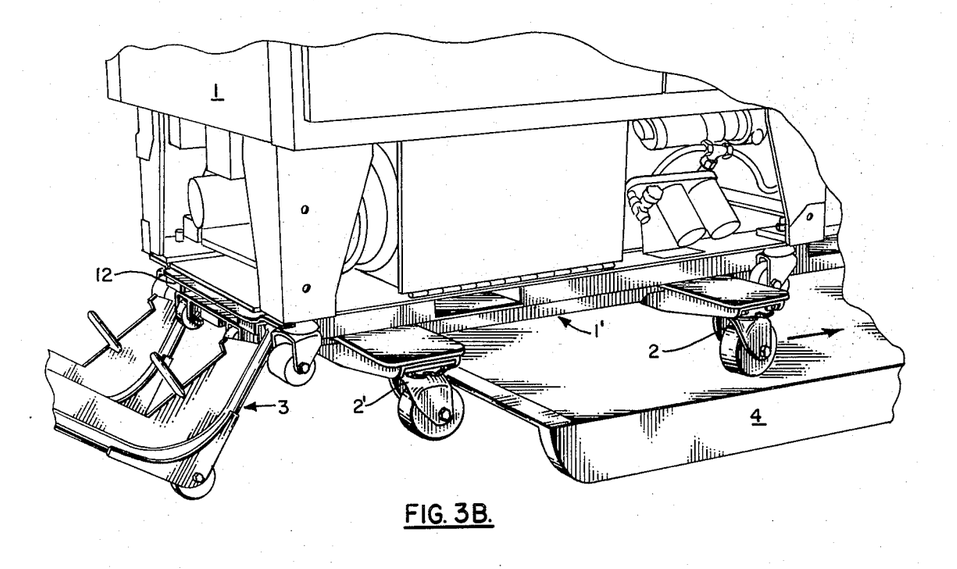
Figure 4A:
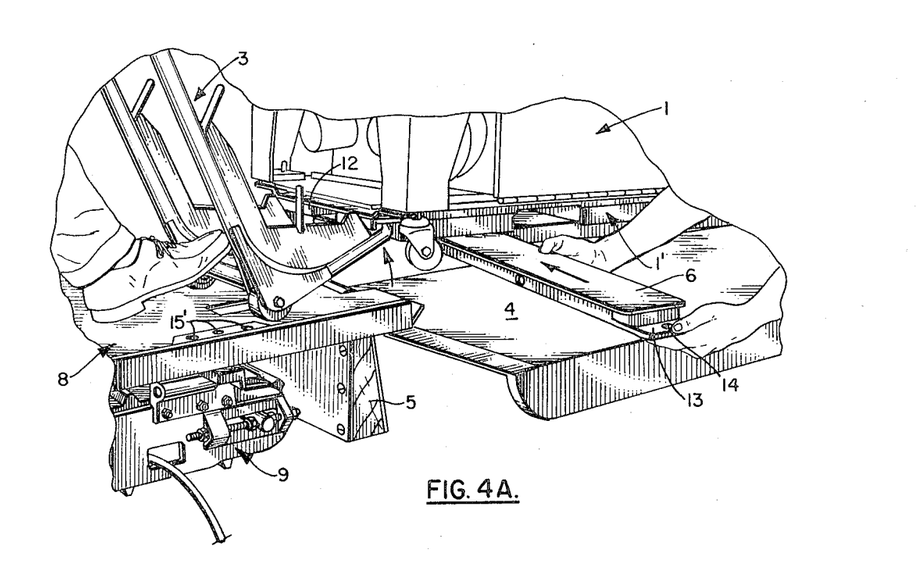
Figure 4B:
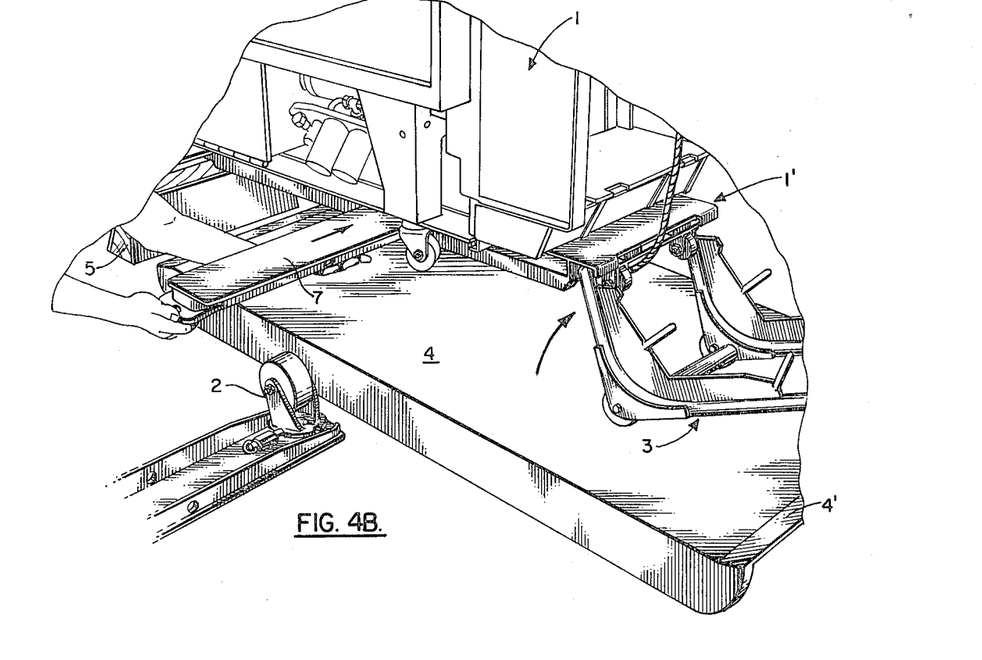
Figure 4C:
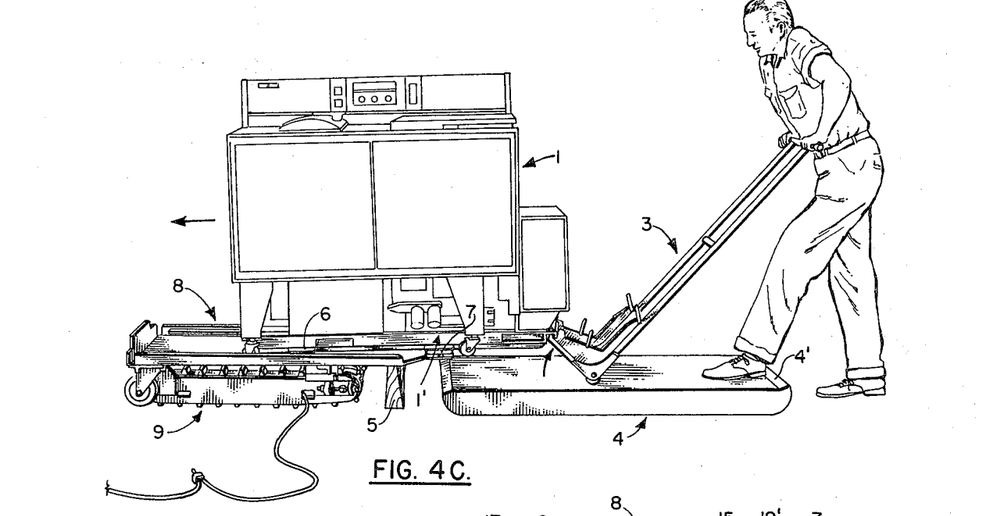
Figure 5A:
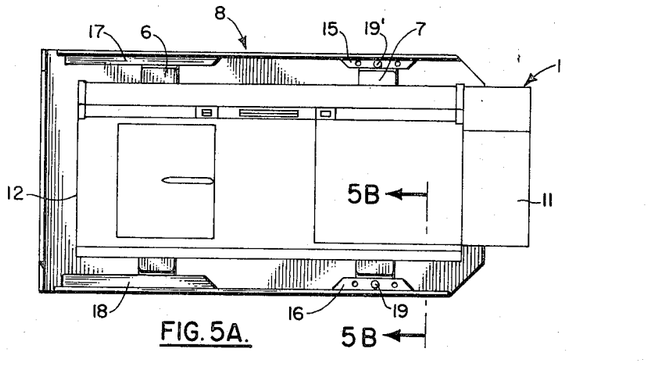
Figure 5B:
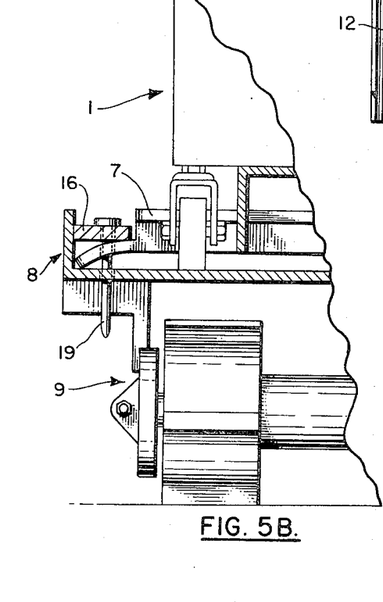
FIG. 5B is a front, fragmentary cross-sectional view along section lines 5B—5B of FIG. 5A, both showing the sliding, mating relationship between the side flanges and slots of the load platform and the tractor platform, respectively.

As shown in FIGS. 3–5, the load (2400 family machine) 1, which is mounted on and combined with the base sled 1' of my copending application, is loaded on the tractor unit 9 in the following manner.

By use of the lever arm jacking assembly 3 which engages the combined load 1,1' at its bottom end 11, the combined load 1,1' is lifted up and onto the intermediate platform 4 by pushing the lever arm jacking assembly 3 down and pulling it back (FIG. 3A). Once the first end 11 of the combined load 1,1' is sitting on the platform 4, the lever arm 3 is disengaged and brought to the other end 12. In like fashion, the lever arm jacking assembly 3 is used to raise end 12 up (FIG. 3B) and the combined load 1,1' can then be pushed completely onto the platform 4, if desired.

As shown in FIG. 4A, the tractor unit 9 is then brought into position adjacent platform 4 and wedge block 5 positioned near its end for support. The end 12 is then again raised by means of the lever arm jacking assembly 3 and the first caster element 2' is then removed by unlocking it and removing it from its transverse channel. In its place is inserted first adapter element 6, which has a similar midstructure to the caster element but, rather than a caster, has a side skirt or flange 13 at each end. The flanged adapter element 6 is tacked into the lateral channel by means of a mid-positioned spring bolt (not illustrated), in like fashion to the caster element 2'.

As the end 12 is raised for this second time, the mover or operator is standing on the load platform 8 which is attached to the tractor unit 9. After the adapter element 6 is substituted for its corresponding caster element 2', the combined load 1,1' is then pulled towards the tractor unit 9 and drawn on and into the special load platform 8.

The load platform 8 includes for load mounting purposes a set of four side slots, two in front and two in back, which are formed by inwardly extending flanges 15–18 and the side and base plates of the load platform 8. As best seen in FIG. 5B, these side slots mate with and hold the side flanges 13 of the adapter elements. As the combined load 1,1' is drawn on and into the slotted load platform 8, the side flanges 13 of the adapter element 6 are pulled into and through the platform slots, mating therewith, and interlocking the combined load 1,1' and load platform 8 together.

After this mating relationship is begun and secured, the mover or operator returns to the other end 11 of the base sled. With the use of the lever arm jacking assembly 3, the other end 11 is raised off the platform (note FIG. 4B) and adapter element 7 (identical to adapter element 6) is substituted for caster element 2. The combined load 1,1' is then completely pushed into the load platform (note FIG. 4C) with the side flanges 13 of adapter element 7 likewise mating with the side slots of the load platform 8, until it reaches the general position shown in FIG. 5A.

In order to lock the combined load 1,1' to the load platform 8 and hence to the tractor unit 9, a series of holes 15' are placed in at least the front set (15,16) of slots. Locking pins 19,19' are inserted on both sides through the holes 14 in the side flanges 13 of the adapter element 7 and through the closest of the holes 15' in the platform slots. The pin-holes, slot-flange combinations serve to permit easy locking and unlocking of the combined load 1,1' to the load platform 8.

The combined load 1,1' is thus mounted on the tractor unit 9 and secured thereto.

The structural details, use and operation of the lever arm assembly 3, the caster elements 2,2' and the base sled 1' is more fully described in the copending parent application and reference is made thereto.

In the mounting operation, the intermediate platform 4 is merely used to allow the combined load 1,1' to be brought up to the level of the load platform in stages, since the lift angle would be too great to allow direct movement of the load from the ground up to the load platform 8. If the load platform 8 were not as high with respect to where the side flanges 13 are located on the combined load 1,1', or vice versa, the intermediate platform would not be necessary. For safety purposes, an upstanding lip 4' is built into the far end of the intermediate platform 4 to prevent an operator from moving the load too far over on the platform 8 and off its end.

The tractor unit 9 is more fully described in the Harlan patent (U.S. Pat. No. 3,512,658) and reference is made thereto. Likewise, the basic technique of traversing stairs with the use of an inclined dolly discussed in the Harlan patent is generally pertinent here. However, for the sake of brevity, the pertinent disclosures of the Harlan patent will not be repeated in detail, but instead the entire disclosure thereof is hereby bodily incorporated herein for the fullest understanding and appreciation of the present invention. Thus, in the following discussion of the stair climbing technique, emphasis will be placed more on the differences and modifications taught by the present invention.

Also, again in the interest of brevity, the structural make-up of the various elements of the present invention will not be discussed in verbal detail, but only generally alluded to throughout this specification, because these structural details are clearly shown and fully disclosed in the highly detailed drawings presented herewith. Full reference thereto is hereby made.

STAIR CLIMBING TECHNIQUE

Now that the load, for example, the Xerox 2400 unit 1 is mounted atop the stair climber tractor unit, the operation of moving the loaded system from the horizontal ground level surface up and over the first flight of stairs will be described. In order to accomplish the move, three additional pieces of equipment will come into action, namely, the wedge block 5 which was used to support the end of the load platform 8 during loading, the collapsible dolly 21 and a bridging element 22. These additional units are best shown in use, for example, in FIGS. 7 and 9A, wherein they are used to allow the loaded stair climber to begin its movement from the horizontal ground level to the initial steps of the first series of stairs.

The wedge block 5 is simply a wedge that allows the stair climber to gradually start its upward climb to the stairs. The wedge block 5 is placed in front of the collapsible dolly 21 as illustrated best in FIG. 7.

As shown in FIGS. 6A–D, the collapsible dolly, which is an important part of the present invention, comprises a horizontal bottom platform 28 onto which five sets of caster wheels 23–27 are located, and disposed all across the bottom as needed and desired in view of the load to be carried. Because the overall load is placed on the dolly 21 at different points and in different dispositions, a large number of casters are usually needed.

The center strut member 31 is the support upon which the collapsible platform 32 is hinged at its center. The end support member 34 at end 29 of the collapsible dolly is hinged to the collapsible platform 32 at hinge 35. The end support member 34 is held in its raised, supporting position by spring 33 which is attached at one end to the end support 34 and at the other end to the horizontal bottom platform 28. The spring 33 holds the end support member 34 in the vertical position against abutment 36 which is fixedly attached to the horizontal bottom platform 28. With end support 34 in its spring-biased, raised position, the load-bearing platform 32 is parallel to the platform 28, as illustrated in FIG. 6B.

In order to collapse the dolly from a horizontal to an inclined position, the end support member 34 is moved from the perpendicular position to platform 32 to an angular position with respect to platform 32. At the same time, the end 29 of the platform 32 is lowered so that it comes into contact with the horizontal platform 28, producing an inclined surface (note FIG. 6D). To lock and secure the dolly 21 in its inclined position, a locking and support member 37 located towards the end 30 of the collapsible dolly is swung up into position at hinge 38 and interlocks into a lip lock 39 located on the inside of the support member 42 of the collapsible platform 32.

Figure 6A:
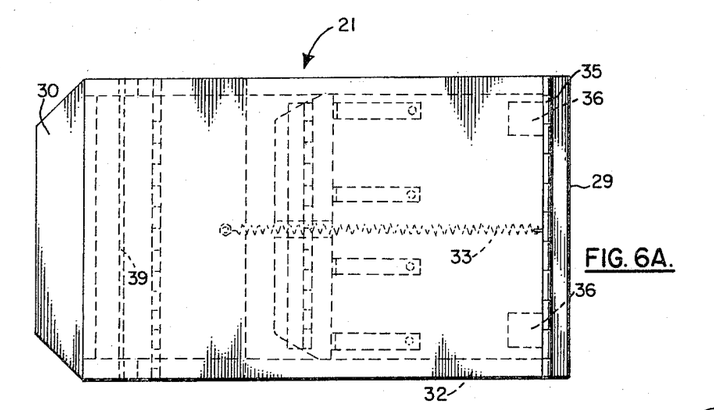
FIGS. 6A–6C are top, side and front views of the collapsible dolly of the present invention in its collapsed or horizontal position, with its inner, hidden structural elements in phantom lines.
Figure 6B:
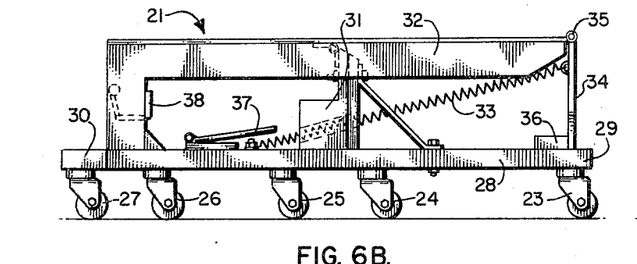
Figure 6C:
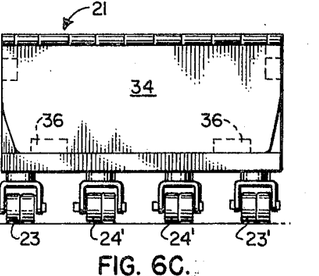
Figure 6D:
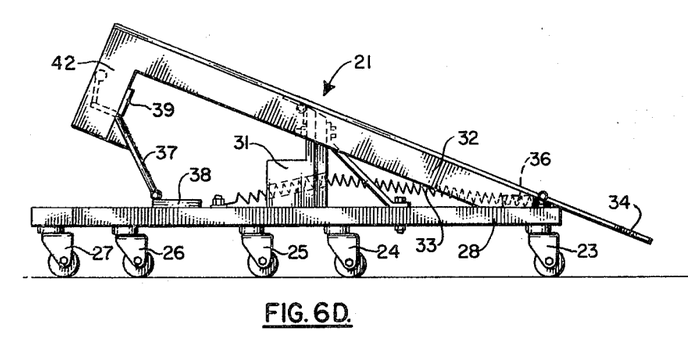
FIG. 6D is a side view of the collapsible dolly 32 in the upright or inclined position, again with its inner, hidden structural elements shown in phantom lines.

To return the dolly 21 to its horizontal position, upward pressure is applied to the member 42 at end 30, releasing hinged locking plate 37, the latter then being returned to its inoperative position (as shown in FIG. 6B). Applying downward pressure to the member 42 causes the platform 32 to return to a horizontal disposition while spring 33 pulls hinged locking plate 34 back into its raised, locking position shown in FIG. 6B.

The bridge member 22, as shown in FIGS. 9A–9D, consists of a rigid rectangular element designed to sustain a load while only being supported at each end. In use, the forward end is supported on the stairs, while the rear end is supported on the member 41 attached to the vertical support member 42 of the tiltable platform 32 (note FIG. 10). The interlock here consists of a circular trough 40 within the end of the bridging member 22 that interlocks with the horizontally disposed rounded member 41 attached to the vertical support member 42. This interlock between the half-round trough 40 and the circular dowel 41 gives excellent resistance to the forward and backward motion that may be caused due to the stair crawler moving from the vertical platform 32 to the bridging platform 22.

Figures 7, 7A, 8:
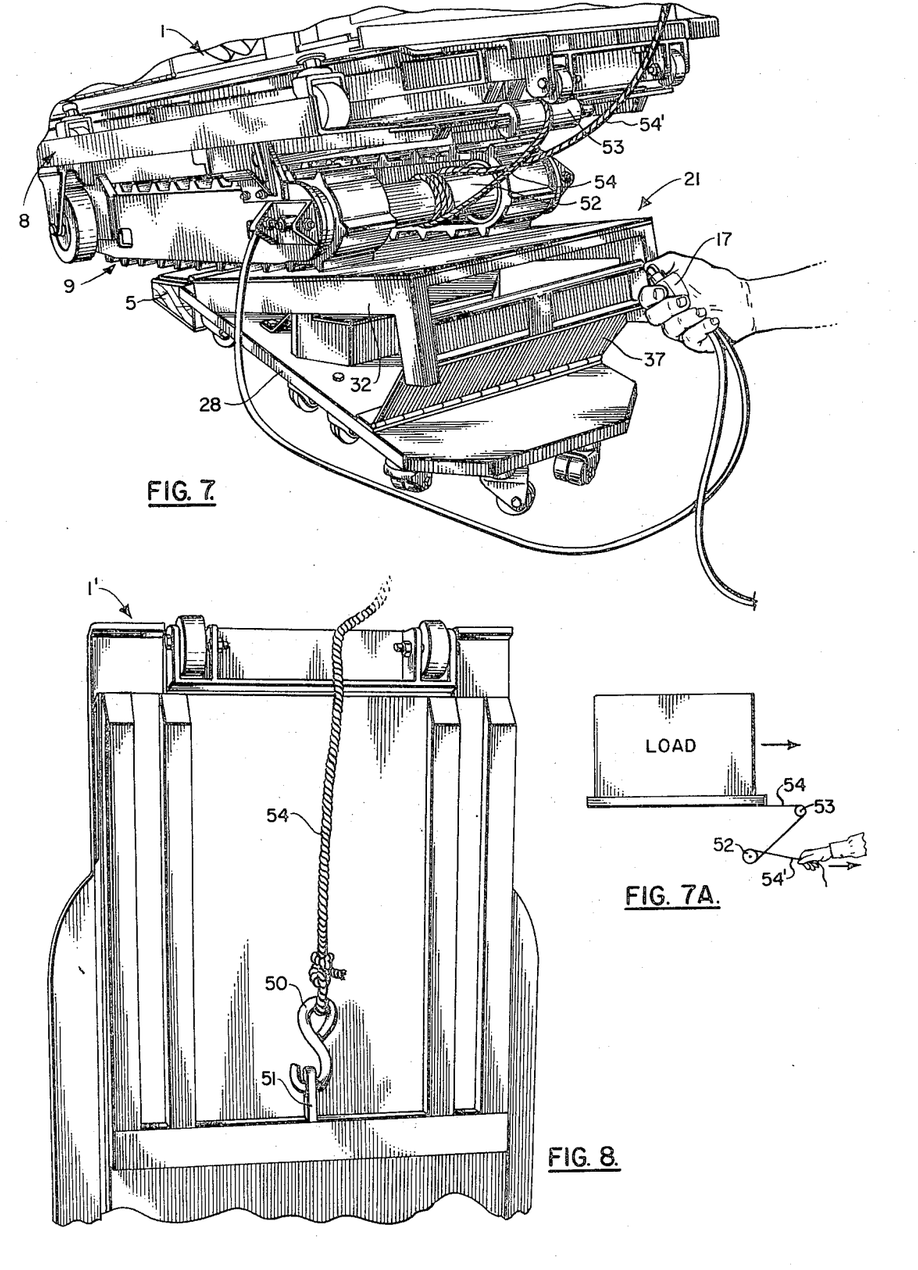
Figures 9A, 9B:
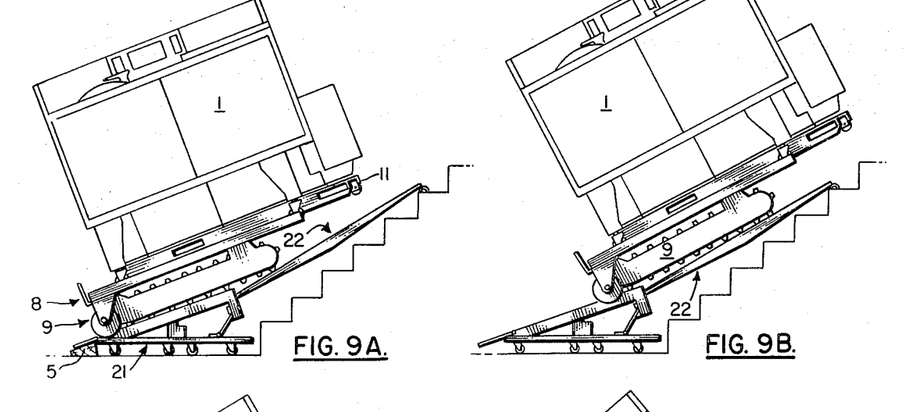
FIGS. 9A—9H are side views of the moving system of the present invention being driven up a flight of stairs and onto an intermediate stair landing; each figure showing a different stage of the move.
Figure 9C:
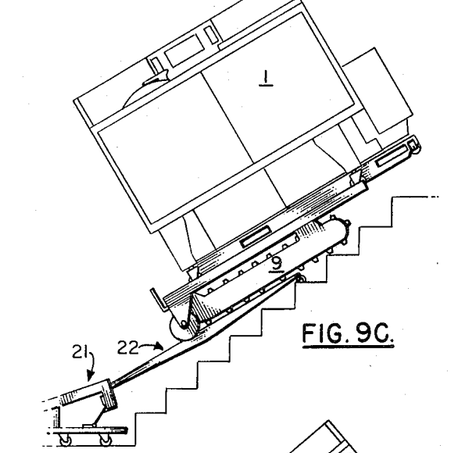
Figure 9D:
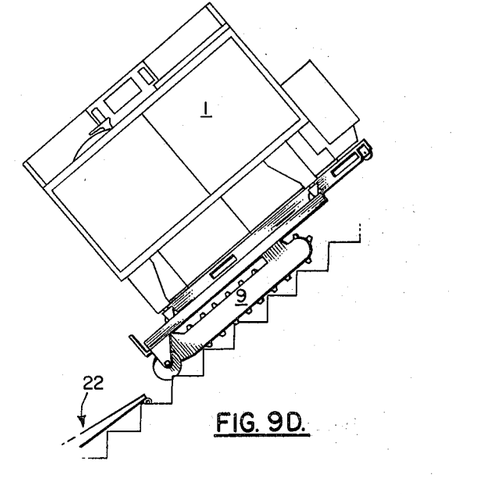
Figure 9E:
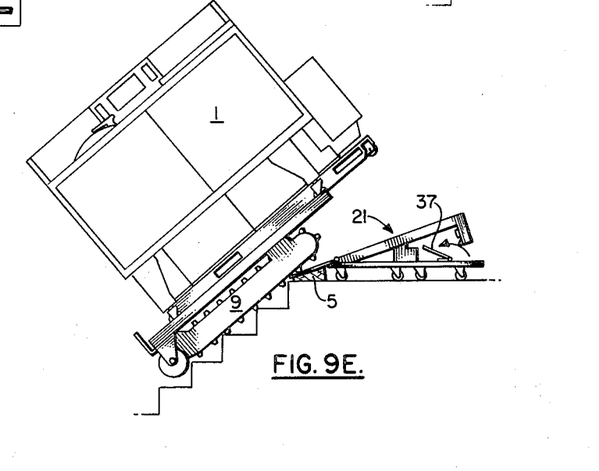
Figure 10:
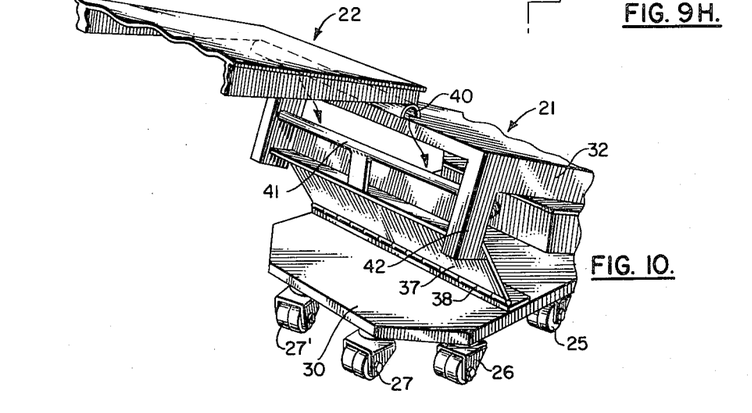
FIG. 10 is a fragmentary, perspective view showing the attachment of a bridging element to the front edge of the collapsible dolly when the loaded tractor unit is to begin transversing a flight of stairs, as shown in FIGS. 9A–9C.

With the wedge block 5 in position, as shown in FIG. 7, the tiltable or collapsible dolly tilted and in position, as shown in FIG. 9A, and the bridging member 22 positioned from the collapsible dolly to the stairs, as also illustrated in FIG. 9A, the loaded stair climber can now ascend from the horizontal surface up the stairs.

By activating the electric motor power switch 17 (FIG. 7), the tractor unit of the loaded stair climber is caused to begin traveling up onto the inclined dolly 21, then up and across the bridging member 22 and up the flight of stairs (FIGS. 9A–9E). During its traverse, it is often desirable and sometimes even necessary to alter the center of gravity of the loaded stair climber in order to make it easier to handle or to prevent it from tumbling back over onto itself and down the stairs.

Changing of the center of gravity is accomplished by an internal winch system, which is an important part of the present invention. As described above, the side flanges 13 and front slots 15,16 are locked together by pins 19,19', preventing relative movement between the load and the tractor unit 9 with its attached load platform 8. It should be again noted at this point that the flanges 16,15 have holes 15' equally spaced along the length thereof. These holes 15' are provided to reposition the load with respect to the tractor unit 9.

An internal winch has been created on the tractor unit 9 by placing a tubular member 52 between and across the tracks of the tractor unit 9, as illustrated in FIG. 7, and fixedly attaching it thereto so that the tubular winch member 52 turns in a clockwise direction (from perspective of FIG. 7) when the stair climber is climbing the stairs or, generally, when the stair climber is in forward operation.

Additionally, the forward end of the load platform 8 is equipped with an idler roller 53 over which a rope 54 is positioned. As illustrated in FIG. 8, one end of the rope 54 is attached to a hook 50, which in turn is attached to an eye 51 welded to the bottom side of the sled 1'.

The other end of the rope 54 is then guided around the tubular member 52 many times. The combination of the rope 54 and the driven tubular member 52 produces in effect a friction clutch so that, when tension is applied to the loose end of the rope 54, friction will be created between the rope and the tubular member 52 causing the rope to be wound up onto the tubular member 52. This will cause the combined load 1,1' to move or try to move forward with respect to the load platform 8. When no tension is applied to the free end of the rope 54, the loose fit it has around the tubular member 54 allows it to slip and no pulling pressure is applied to the sled 1'.

The winch system is operated as follows. With the loaded stair climber on an incline, as for example when it is on the tiltable dolly as illustrated in FIG. 7, the component of the gravitational force parallel to the incline will put pressure on the pins 19 and 19' which are holding the side flanges 13 in locked position. By putting a little pulling pressure or tension on the rope 54 as the stair climber is in motion and the drum 52 is turning, sufficient upward force is supplied to the sled 1' to overcome the downward force of gravity, and the pins 19 and 19' become loose and can be removed.

Continued pull on the ope 54 will supply sufficient mechanical advantage through the rotating element 52 to actually move the sled 1' formed with respect to the load platform 8 (note FIG. 7A). When the combined load 1,1' moves up to the desired position, the pins 19 and 19' can be replaced back into the appropriate sets of holes 15' with which the holes 14 are then aligned. The load has thus been shifted forward on the load platform, thereby shifting the center of gravity of the overall system forward, i.e., up to the right.

It should be noted that as a general rule when on a horizontal surface it is useful for good balance for the pins 19 and 19' to be in the last holes in the inwardly directed flanges 16 and 15. Then, as the loaded stair climber proceeds forward, the maximum amount of relative forward movement of the load is possible. As the sled 1' moves forward with respect to the load platform 8, the pins 19 and 19' should be stepwise increased from the rear holes to the uppermost holes. This, of course, changes the center of gravity of the system forward making the unit more stable as it proceeds up the stairs.

The direction of load shifting is, of course, reversible. Upon reaching a landing or another horizontal surface, it is often desirable to allow the load to slide backwards with respect to the load platform 8, shifting the center of gravity backwards. Here again a slight pressure is applied to the rope 54 as the tractor unit moves forward to remove the pressure off of the pins 19,19' so that they can be removed. The pressure on the rope 54 is then released, allowing the load under the action of gravity to slide back down the slots provided by 15, 16, 17 and 18 on the load platform 8. Pins 19 and 19' can be replaced in the rearmost or other appropriate holes of the inwardly directed flanges 15, 16.

All of the changing of the load with respect to the load platform 8 must be done while the stair crawler is in motion up the stairs or otherwise, except for when the load is allowed to slide back under the force of gravity. This is easily accomplished since the stair climber travels at a very slow rate of speed, and one man has sufficient time to make all these proposed adjustments in the operation. Moreover, if the timing of the shifting of the load is off with respect to the position of the tractor unit as it traverses the stair and from one dynamic situation to another, the powered stair climber is merely put into reverse and the process restarted. Standard powered crawlers such as the "Harlan" tractor unit are provided with a handy reverse.

Of course, it is noted generally that if the requirements of a particular application needed it, the relationship between the direction of pull of the sled by the winch system and the direction of travel of the tractor unit could be switched merely by winding the rope 54,54' in the opposite direction around drive role 52. In such a variation, the load would be moved forward when the tractor was moving in reverse or backwards. As seen in FIGS. 9E-9H, after moving up the stairs, the next movement of the stair climber will be to go from the inclined stairs to a horizontal surface.

There are two possibilities. First, the horizontal platform could be a middle landing so that the landing must be crossed over to then proceed up a second flight of stairs. In such a case, the block wedge 5, collapsible dolly 21 and the bridge member 22 would be used again as before, after the system has been properly aligned and the landing crossed.

On the other hand, if the mover has reached the top of the stairs to which the load is to be transported, the only change that need be taken at this point is to change the center of gravity back down to its preferred position when horizontal so that, when the climber reaches the top step, the moving system will not have a tendency to fall forward onto the horizontal surface. Of course, the center of gravity should then be changed as previously described.

Figure 9F:
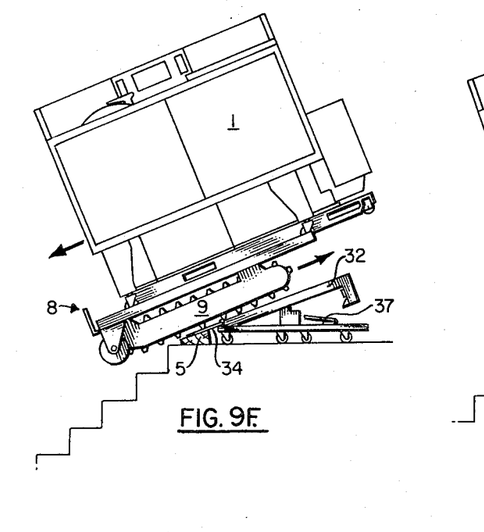
Figure 9G:
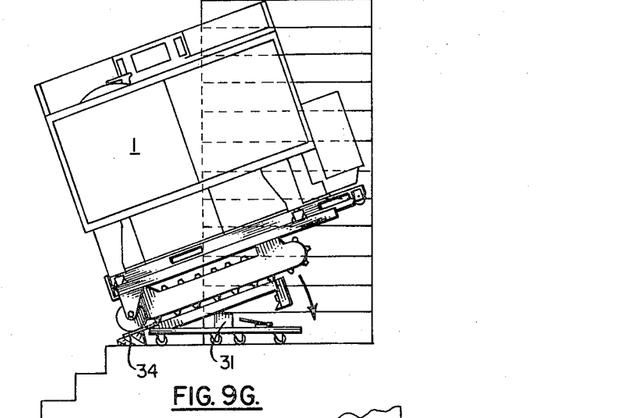
Figure 9H:
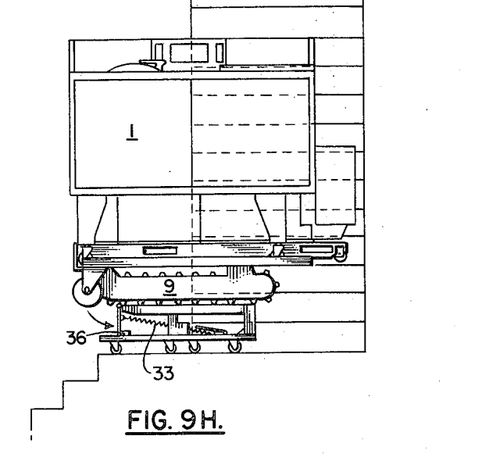

However, for the purposes of further illustration and discussion of the invention, it will be assumed that the horizontal surface is a landing which must be transgressed to get a second flight of stairs and that the second flight is at ninety degrees to the first (note FIGS. 9G and H), requiring the rotation of the system by ninety degrees. The transgressing of such a landing is illustrated in FIGS. 9F-H. The wedge block 5 is placed at the top of the last step and the collapsible dolly 21 in its inclined position positioned behind the block 5. As the stair climber proceeds up the block 5 and onto the collapsible or inclined dolly 21, the load should be positioned to its rearmost position with respect to the tractor unit 9, thereby positioning the center of gravity more to the rear of the tractor unit 9. The change in the center of gravity is done in anticipation of bringing the loaded stair climber back to the horizontal position when it is sitting on the dolly 21. As the stair climber 9 moves up on the dolly 21, its weight will cause the tiltable platform 32 to move into its horizontal position, the locking plate 37 having been moved aside. At the same time, the spring biased support member 34 is pulled into its vertical position by the spring 33 until it is stopped by the abutment 36, locking the dolly 21 in its horizontal disposition. At this point, the loaded stair climber is now atop the collapsible dolly and in a horizontal position.

In the horizontal position and with the load moved all the way back with respect to its platform 8, the ninety degree rotation of the unit on the landing will take less room and less space, thereby allowing movement of much larger loads through smaller spaces or landings than have been accomplished before.

Figure 9I:
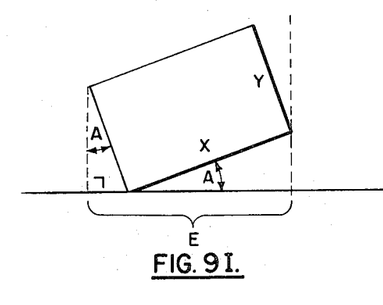
FIG. 9I is a schematic, geometrical figure illustrating the difference in the total horizontal, longitudinal dimension between the system being in an inclined position and a horizonal one.

The amount of space savings achieved by being able to change from an inclined to a horizontal disposition can be seen by considering FIG. 9I. If $X$ and $Y$ are the longitudinal and vertical dimensions of the load or machine 1, and $A$ is the angle of inclination of the dolly, then the effective horizontal, longitudinal dimension E by basic geometry is seen to be $$E = Y \sin A + X \cos A.$$

Typical dimensions encountered, for example, in the movement of a "Xerox" 2400 family machine is $X=60''$, $Y=45''$ and $A=45°$. It is thus seen that in such a situation $E$ is approximately 73.5 long or 13.5 inches longer than $X$. Although just a matter of inches, this amount (in excess of a foot) is often the difference between being able to use a stair climber and being forced to manually carry the machine up the stairs with a crew of men, the latter "alternative" almost being a guarantee of damage to the machine.

After the loaded stair climber is effectively shortened by being moved to a horizontal position (FIG. 9H), it is rotated 90° so it can then face the next flight of stairs (shown in the background of FIGS. 9G and 9H). Once the rotation is complete and the unit is in position to start ascending the next flight of stairs, the spring-biased element 34 can be moved into its angular, non-locking position with the tiltable platform 32 and the dolly 21 again inclined. The bridging element 22 is put in position from its horizontal support member 42 on the opposite end of the dolly and the other end of the bridging member 22 mounted on the next flight of stairs.

The stair climber is again actuated and the ascending of the next flight of stairs is accomplished. It should be noted, though, that as the angle increases in moving from the dolly to the bridge to the stairs, the center of gravity of the unit should be shifted with respect to the load platform 8 by using the winch mechanism 52, as previously described, and repositioning the pins 19 and 19' in the furthermost holes of the flanges 15, 16.

The final step is the unloading of the machine 1. Once the top step on the last flight of stairs is reached, the center of gravity of the combined load 1,1' is shifted to the rearmost position with respect to the load platform 8, allowing the stair climber to gradually fall to a horizontal disposition. The stair climber is then driven to the desired location of the "Xerox" machine, or other load, within the building.

The unloading of the machine 1 from the tractor unit and then from the sled 1' is accomplished by reversing the steps followed in loading the machine, as previously described.

It should be noted that the stair climber is very slow. Thus, if any distance is still involved once the proper level is reached, the combined sled/machine 1,1' can be placed back on the dual set of caster wheel elements 2,2' for speed in transporting the unit to its desired location.

Nearly unlimited variations, alterations and changes in the design and detail of the preferred embodiment are possible within the scope of the present invention. In addition to those exemplary changes discussed above, there are, of course, many other ways in which the present invention may be practiced.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A method of moving a load up a flight of stairs comprising the following steps:
   a. providing a stair climber having driving elements for locomotion of the stair climber;
   b. mounting a load on the stair climber so that it can be readily and easily moved in a longitudinal direction with respect to said stair climber;
   c. providing an internal winch for longitudinally moving the load with respect to the stair climber to change the center of gravity of the overall loaded stair climber for the proper balancing thereof, the internal winch including a roller mounted on the axis of the driving elements of the stair climber and being driven thereby and a line loosely wrapped thereon with one end free and the other end attached to the load; and
   d. moving the load by means of said internal winch by putting tension on the loose end of said line to thereby change the center of gravity of the loaded stair climber.

2. The method of claim 1 wherein there is further included the following steps:
   e. mounting the stair climber on an inclined collapsible dolly; and
   f. changing the effective horizontal, longitudinal dimension of the loaded stair climber and dolly by changing the disposition of the dolly from an inclined to a horizontal disposition.

3. The method of claim 2 wherein the stairs include at least two flights of stairs angularly disposed with respect to one another with a landing therebetween and in step "e" the collapsible dolly is positioned on the landing, and wherein there is further included after step "f" the following steps:
   g. rotating the dolly while in its horizontal disposition with the loaded stair climber thereon to align it with the next flight of stair;
   h. changing the disposition of the dolly back to its inclined disposition; and
   i. moving the stair climber off of the inclined dolly onto the next flight of stairs.

4. The method of claim 3 wherein, in anY step subsequent to step "d," there is included step "d" to further aid in the handling of the loaded stair climber.

5. The method of claim 1 wherein in step "c" the line is wrapped around the roller so that it goes over, around and then under said roller, so that in step "d," when tension is put on the loose end of said line, the center of gravity of the load moves with respect to the stair climber in the same direction as the stair climber itself moves.

* * * * *